US005467139A

United States Patent [19]
Lankford

[11] Patent Number: 5,467,139
[45] Date of Patent: Nov. 14, 1995

[54] MUTING APPARATUS FOR A COMPRESSED AUDIO/VIDEO SIGNAL RECEIVER

[75] Inventor: Douglas E. Lankford, Carmel, Ind.

[73] Assignee: Thomson Consumer Electronics, Inc., Indianapolis, Ind.

[21] Appl. No.: 245,113

[22] Filed: May 17, 1994

Related U.S. Application Data

[63] Continuation-in-part of Ser. No. 129,974, Sep. 30, 1993.
[51] Int. Cl.$^6$ .................................................. H04N 9/475
[52] U.S. Cl. ........................ 348/512; 348/515; 348/423
[58] Field of Search ................................ 348/512, 515, 348/518, 513, 516, 423, 484, 462, 738; H04N 5/60, 9/476

[56] References Cited

U.S. PATENT DOCUMENTS

| | | | |
|---|---|---|---|
| Re. 33,535 | 2/1991 | Cooper | 348/512 |
| 4,398,220 | 8/1983 | Satoh | 348/738 |
| 5,381,186 | 1/1995 | Lee | 348/738 |

Primary Examiner—James J. Groody
Assistant Examiner—Michael H. Lee
Attorney, Agent, or Firm—Joseph S. Tripoli; Eric P. Herrmann; Ronald H. Kurdyla

[57] ABSTRACT

A compressed audio/video, A/V, receiver provides A/V component timing reference signals (PTS's) coincident with reproduction of associated decompressed component signals. Synchronization apparatus generates a function of the difference of occurring component audio and video PTS's. This function, which is indicative of relative audio and video synchronization, is compared with a predetermined threshold value, and a mute control signal is generated when the threshold is exceeded. Muting circuitry, responsive to the control signal disables audio reproduction when the reproduced audio and video component signal timing deviate from mutual synchronization.

10 Claims, 5 Drawing Sheets

MUTING APPARATUS FOR A COMPRESSED AUDIO/VIDEO SIGNAL RECEIVER

This is a continuation-in-part of application Ser. No. 08/129,974, filed 30 Sep. 1993. This invention relates to a method and apparatus for controlling muting of audio and/or video components in a compressed audio/video (A/V) signal receiver.

BACKGROUND OF THE INVENTION

MPEG is a compressed video signal protocol established by the Moving Pictures Experts Group of the International Standardization Organization. This protocol defines a versatile signal format which includes both intraframe coding and motion compensated predictive coding. Due to variations in coding format frame to frame, and variations in image content, different frames have widely divergent quantities of compressed data. As a consequence of different frames being compressed with different quantities of data etc., frames of data tend to be transmitted asynchronously.

Audio signals may also be compressed according to an MPEG protocol. Compressed audio may be associated with video but transmitted independently. For transmission the compressed audio is segmented into packets which are then time division multiplexed with the compressed video signal in a non synchronous manner.

Associated compressed audio and video components are not only independently asynchronous, but their mutual temporal relationships or synchronism is nonexistent in transmission.

MPEG compressed audio and video component signals may include presentation time stamps (PTS) to establish a reference between particular compressed signal segments and a system reference clock signal. The audio and video PTS's are utilized by receiver apparatus to both resynchronize respective decompressed components and to restore their temporal interrelationship.

A particularly annoying feature of reproduced A/V material is a loss of lip-sync which is the loss of synchronization between lip or mouth movement and the associated spoken word or audio. One of the objects of this invention is the elimination of annoyances of loss of lip-sync.

SUMMARY OF THE INVENTION

An A/V receiver according to the present invention provides A/V component timing reference signals (PTS's) coincident with reproduction of associated decompressed component signals. Synchronization apparatus generates a function of the difference of occurring component audio and video PTS's. This function, which is indicative of relative audio and video synchronization, is compared with a predetermined threshold value, and a mute control signal is generated when the threshold is exceeded. Muting circuitry, responsive to the control signal disables audio reproduction when the reproduced audio and video component signal timing deviate from mutual synchronization.

DETAILED DESCRIPTION

Figure 1:
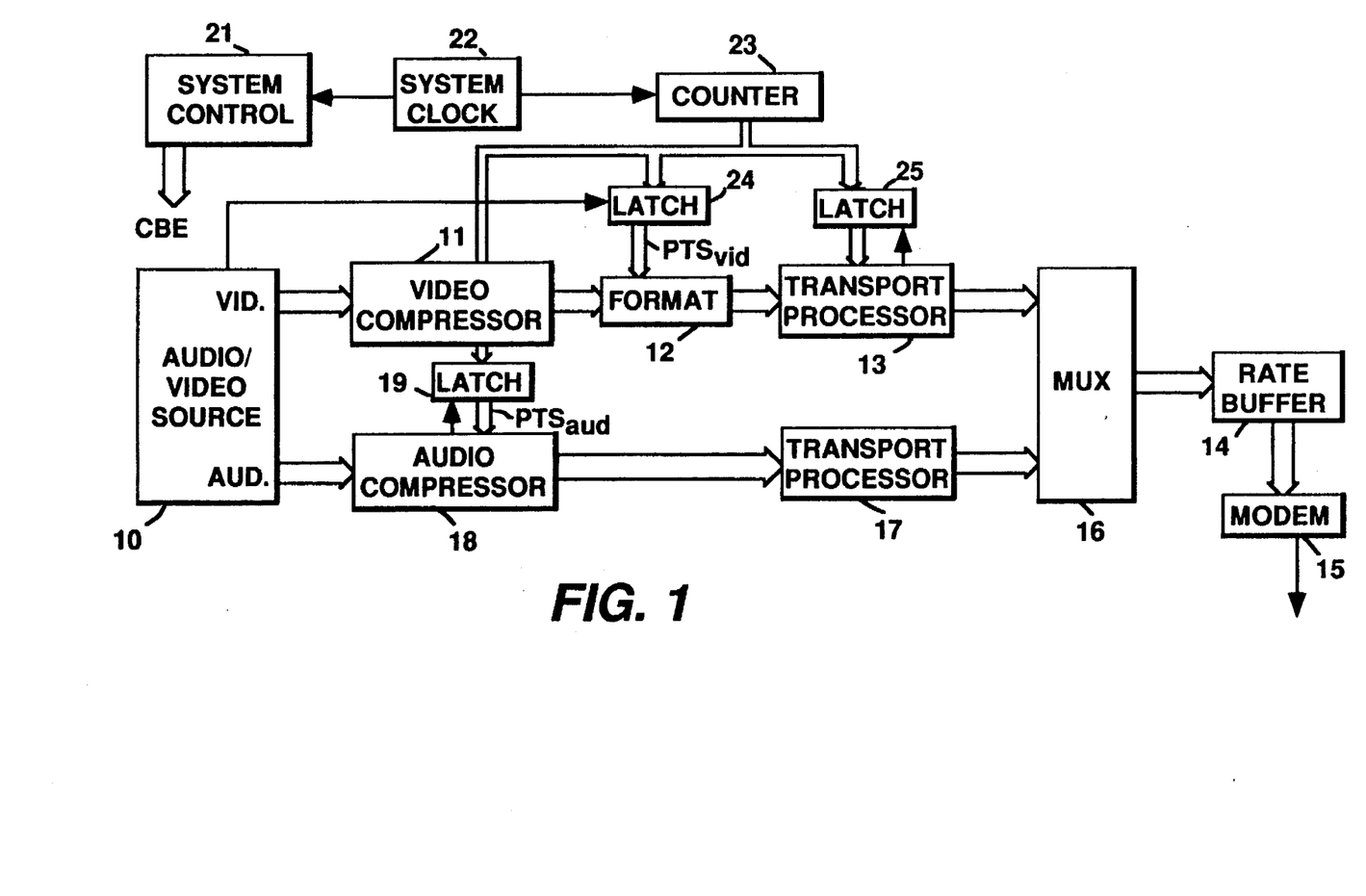
FIG. 1 is a block diagram of audio/video compression apparatus.

FIG. 1 illustrates a typical system in which the invention may be practiced, which system is a compressed digital video signal transmission arrangement. In this system, video signal from a source 10 is applied to a video signal compression element 11 which may include a motion compensated predictive encoder utilizing discrete cosine transforms. Compressed video signal from the element 11 is coupled to a formatter 12. The formatter arranges the compressed video signal and other ancillary data according to some signal protocol such as MPEG, a standard developed by the International Organization for Standardization (Organization Internationale De Normalisation). The standardized signal is applied to a transport processor 13, which divides the signal into packets of data and adds certain overhead to provide some noise immunity for the transmission purposes. The transport packets, which normally occur at a non-uniform rate are applied to a rate buffer 14 which provides output data at a relatively constant rate conducive to efficient use of a relatively narrow bandwidth transmission channel. The buffered data is coupled to a modem 15 which performs the signal transmission.

A system clock 22 provides clocking signal to operate much of the apparatus, at least including the transport processor. This clock will operate at a fixed frequency such as 27 MHz for example. As shown herein, however, it is used to generate timing information. The system clock is coupled to the clock input of a counter 23 which may be arranged to count modulo $2^{30}$, for example. The count values output by the counter are applied to two latches 24 and 25. The latch 24 is conditioned by the video source to latch count values on the occurrence of respective frame intervals. These count values are denoted presentation time stamps, PTS's, and are included in the compressed video signal stream by the formatter 12, and are used by the receiver to provide lip-synchronization of associated audio and video information. The latch 25 is conditioned by the transport processor 13 (or the system controller 21) to latch count values according to a predetermined schedule. These count values are denoted system clock references, SCR's, and are embedded as auxiliary data within respective auxiliary transport packets.

Audio signal associated with the video signal from source 10 is applied to an audio signal compressor 18. The compressor 18 provides frame sampling pulses (independent of video frames) to control a latch 19. Responsive to the sampling pulses, the latch 19 captures count values provided by the counter 23. These latched values correspond to audio presentation time stamps $PTS_{aud}$. The $PTS_{aud}$ are incorporated in the compressed audio signal provided by the compressor 18. The compressed audio signal is coupled to a transport processor 17 which divides the signal into packets of data and adds certain overhead to provide some noise immunity for transmission purposes. The audio transport packets provided by the processor 17 are coupled to a multiplexor 16 which time division multiplexes the audio and video transport packets. In the figure, separate transport processors are shown in the audio and video signal processing channels. For systems wherein the data rate is moderate, the functions of the two transport processors and the multiplexor 16 may be subsumed in a single transport processor.

The system controller 21 is a variable state machine programmed to coordinate the various processing elements. Note that the controller 21, the compressors 11 and 18, the transport processors 13 and 17, and the rate buffer 14 may or may not operate synchronously via a common clocking arrangement as long as proper handshaking is provided between processing elements. However, the two compressors both derive PTS values from the same reference counter 23, thus a precise timing relationship between the two compressed signals is provided in the compressed output signal.

Figure 2:
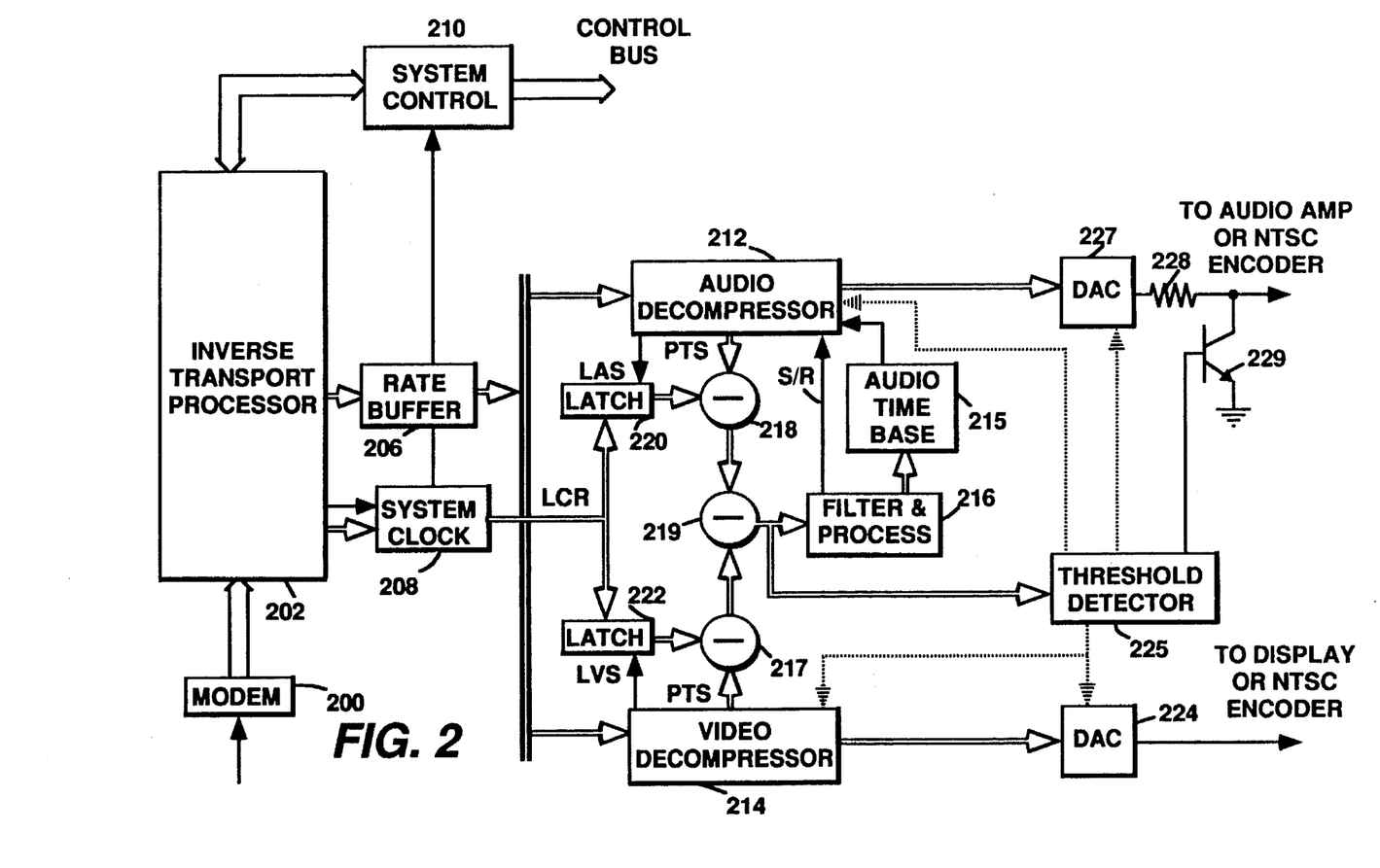
FIG. 2 is a block diagram of a audio/video decompression apparatus embodying the present invention.

FIG. 2 illustrates an exemplary receiver apparatus embodying the invention wherein the modem 200 performs the inverse function of the modem 15 and the rate buffer 206 performs, in effect, the inverse function of the rate buffer 14. An inverse transport processor 202, divides respective transport packets by service and allocates the respective packet payloads differing memory blocks in the rate buffer 206. In so doing the respective transport packet signal payloads are separated from the auxiliary data, with the auxiliary data applied to the system controller 210. In an alternative arrangement a separate transport processor may be included in each processing channel and arranged to recognize and process only data associated with the respective channels.

Compressed video data from the rate buffer 206, is passed to the video decompressor 214. The rate buffer 206 accepts compressed video data at a bursty or inconsistent rate, and provides data on demand to the decompressor 214. The decompressor, responsive to the compressed video signal, generates non-compressed video signal for display or for storage etc., in appropriate display or storage devices (not shown).

Compressed audio data from the inverse transport processor 202 is applied to the rate buffer 206, which provides compressed audio signal according to the system protocol to the audio decompressor 212. The decompressor, 212, responsive to the compressed audio signal generates non-compressed audio signal for reproduction or for storage etc., in appropriate speakers or storage devices (not shown).

The inverse processor 202 also provides SCR's from the auxiliary transport data, and control signals to a system clock generator 208. The clock generator responsive to these signals generates a system clock signal synchronous with at least the transport processor operation. This system clock signal is applied to the receiver system controller 210 to control the timing of appropriate processing elements.

Figure 3:
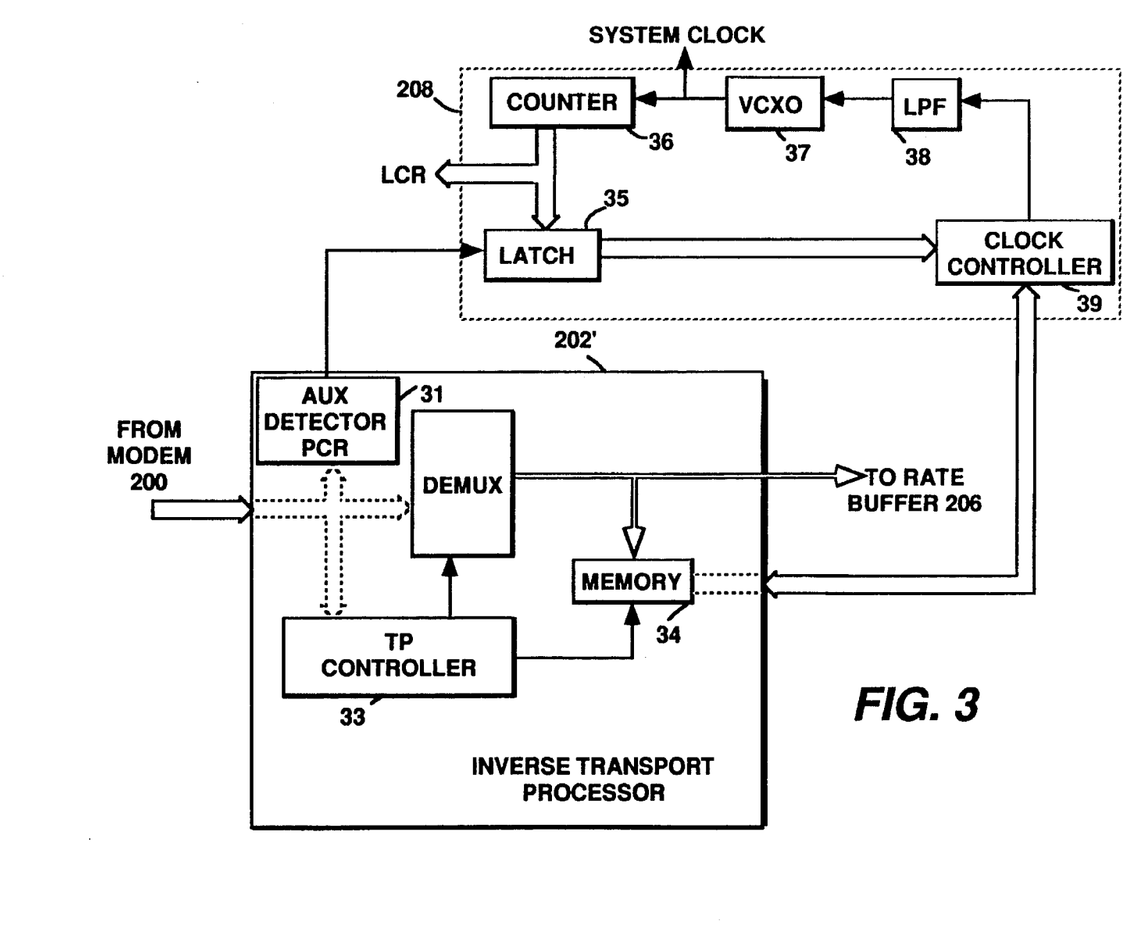
FIG. 3 is a block diagram of apparatus for providing the receiver system clock signal having substantially the same rate as the system clock of the compression apparatus.

FIG. 3 illustrates details of an exemplary clock regenerator 208. Data from the receiver modem 200 is coupled to the inverse transport processor 202', including an auxiliary packet detector 31. The inverse transport processor 202' separates transport header data from the respective transport packet payloads. Responsive to the transport header data, the processor 202' demultiplexes payloads of the desired associated audio and video program components and payloads of associated auxiliary data. The audio video and auxiliary payloads are written to separate memory blocks of the rate buffer 208. The respective memory blocks are each operated as first-in-first out memories or FIFO's, writing data when it is available from the modem and reading data when it is demanded by the corresponding component signal processor (not shown). SCR's present in particular auxiliary packets are routed and stored in a memory element, 34.

An auxiliary packet detector 31, which may be a matched filter arranged to recognize the code words designating an auxiliary transport packet containing a SCR, produces a control pulse on the occurrence of transport packets containing such data. The control pulse is utilized to capture and store within a latch 35, the count value currently exhibited by the local counter 36 at a time precisely related to the time of detection. The local counter 36 is arranged to count pulses provided by a voltage controlled oscillator 37. The counter 36 is arranged to count modulo M which may be, but is not necessarily, the same number as its counterpart counter in the encoder (counter 23). If M differs from N the difference may be accommodated in the error equation.

The voltage controlled oscillator 37 is controlled by a low pass filtered error signal provided by a clock controller 39. The error signal is generated in the following fashion. Let the SCR arriving at time n be designated $SCR_n$, and the local count value concurrently captured in the latch 35 be designated $LCR_n$. The clock controller reads the successive values of SCR's and LCR's and forms an error signal E proportional to the differences $$E \rightarrow |SCR_n - SCR_{n-1}| - |LCR_n - LCR_{n-1}|$$

The error signal E, is utilized to condition the voltage controlled oscillator 37 to a frequency tending to equalize the differences. As indicated previously, negative differences exhibited due to modulo counter wrap around, may be ignored. The error signal produced by the clock controller 39 may be in the form of a pulse width modulated signal, which may be rendered into an analog error signal by implementing the low pass filter 38 in analog components.

The constraints on this system are that the counters at the two ends of the system count the same frequency or even multiples thereof. This requires that the nominal frequency of the voltage controlled oscillator be fairly close to the frequency of the system clock at the encoder.

The foregoing approach provides rather rapid synchronization but may introduce a long term error. Long term error LTE is proportional to the difference $$LTE \rightarrow |LCR_n - LCR_0| - |SCR_n - SCR_0|$$

where $SCR_0$ and $LCR_0$ are for example the first occurring SCR and the corresponding latched value of the receiver counter. Nominally the error signals E and LTE will vary in discrete steps. As such, once the system is "synchronized" the error signal will dither one unit about the null point. The preferred method of synchronization is to initiate control of the voltage controlled oscillator using the error signal E until a one unit dither occurs in the error signal E, and then to switch to the use of the long term error signal LTE to control the voltage controlled oscillator.

The system clock signal provided by the VCXO 37 may be utilized to operate at least the transport processor and rate buffers. Since it is synchronized at least in frequency with the encoder system clock, the possibility of rate buffer overflow or underflow due to clock timing errors is substantially non-existent.

Refer again to FIG. 2 for an explanation of audio/video synchronization. Recall that a presentation time stamp $PTS_{vid}$, is included in the compressed video signal associated with predetermined video data. The $PTS_{vid}$ is indicative of the relative time that the associated video is to be displayed. Similarly the compressed audio signal includes presentation time stamps $PTS_{aud}$ associated with audio to be reproduced at times related to the respective $PTS_{aud}$. At the receiver the $PTS_{aud}$ and $PTS_{vid}$ may not be compared directly to provide A/V synchronization because the respective samples were determined at different instants. The respective PTS values are compared to a continuous time base which is the receiver clock provided by the VCXO 37. This is done by sampling local count values LCR generated by the system clock 208 to capture local time stamps.

When data associated with an associated PTS is presented, The LCR is sampled. For example, The audio decompressor 212 issues a $PTS_{aud}$ when a respective audio frame is output for reproduction. At these times a control signal conditions the latch 220 to sample the LCR, the values of which will be designated LAS, for local audio stamp. Similarly when the video decompressor provides a video frame for display, it provides a $PTS_{vid}$ and a control pulse to condition a latch 222 to store the current value of the LCR. These LCR values are designated LVS for local video stamps.

The LAS and the corresponding $PTS_{aud}$ are coupled to respective input terminals of a subtracter 218 which develops the signal $\Delta_{A-PTS}$ according to the relation;

$$\Delta_{A-PTS} = PTS_{aud} - LAS$$

The LVS and the corresponding PTSvid are coupled to respective input terminals of the subtracter 217 which develops the signal $\Delta_{V-PTS}$ according to the relation;

$$\Delta_{V-PTS} = PTS_{vid} - LVS.$$

The signals $\Delta_{V-PTS}$ and $\Delta_{A-PTS}$ are coupled to respective input terminals of a further subtracter, 219, which develops an A/V synchronization error signal $ERR_{PTS}$ according to the relation;

$$ERR_{PTS} = \Delta_{V-PTS} - \Delta_{A-PTS}$$

Synchronization of the audio and video requires that the A/V synchronization error be driven to zero. Thus, when the difference in the values of the corresponding audio and video PTS's equals the time, in units of the local reference, between the occurrence of the corresponding PTS's, the audio and video signal will be in synchronization.

Two mechanisms may be used to adjust the A/V synchronization based upon the error signal $ERR_{PTS}$; skips and repeats of data sections and conversion clock deviation. Skipping fixed intervals or "frames" of audio advances the audio data stream by a fixed interval relative to the video signal. Repeating (or muting without consuming data) delays the audio data stream by fixed intervals relative to the video signal. Skipping and repeating audio frames is audible under many conditions, and therefore is only utilized for coarse adjustment of synchronization. Even so, brief skipping or repeating may be preferable to discernible audio/video synchronization errors. If the audio frames are less than 40 msec, coarse adjustment by skipping/repeating may result in synchronization errors within ±20 msec., which is within industry standards for A/V synchronization. However, this synchronization will degrade if the audio conversion time base does not match that of the source. Once synchronization is coarsely adjusted, variations of the audio conversion clock frequency are arranged to further refine the A/V synchronization.

The error signal $ERR_{PTS}$ is applied to a filter and processing element 216. A filter function therein smoothes the signal $ERR_{PTS}$ to minimize aberrant effects that might otherwise be generated by signal noise. The processing function in the element 216 then examines the smoothed error signal and determines whether a skip/repeat of audio should be utilized to effect coarse synchronization of the audio and video signals and/or whether an adjustment to the audio processing frequency should be utilized to effect fine synchronization. If a coarse synchronization adjustment is determined to be necessary, the processor 216 provides a control signal (S/R) to the audio decompressor 212 to condition the decompressor to skip or repeat the current decompressed audio frame. Alternatively, or in addition to the coarse adjustment, if a fine adjustment is determined to be necessary, the processor 216 provides a control signal to the audio time base 215 to adjust the frequency of the audio processing clock signal.

Figure 4:
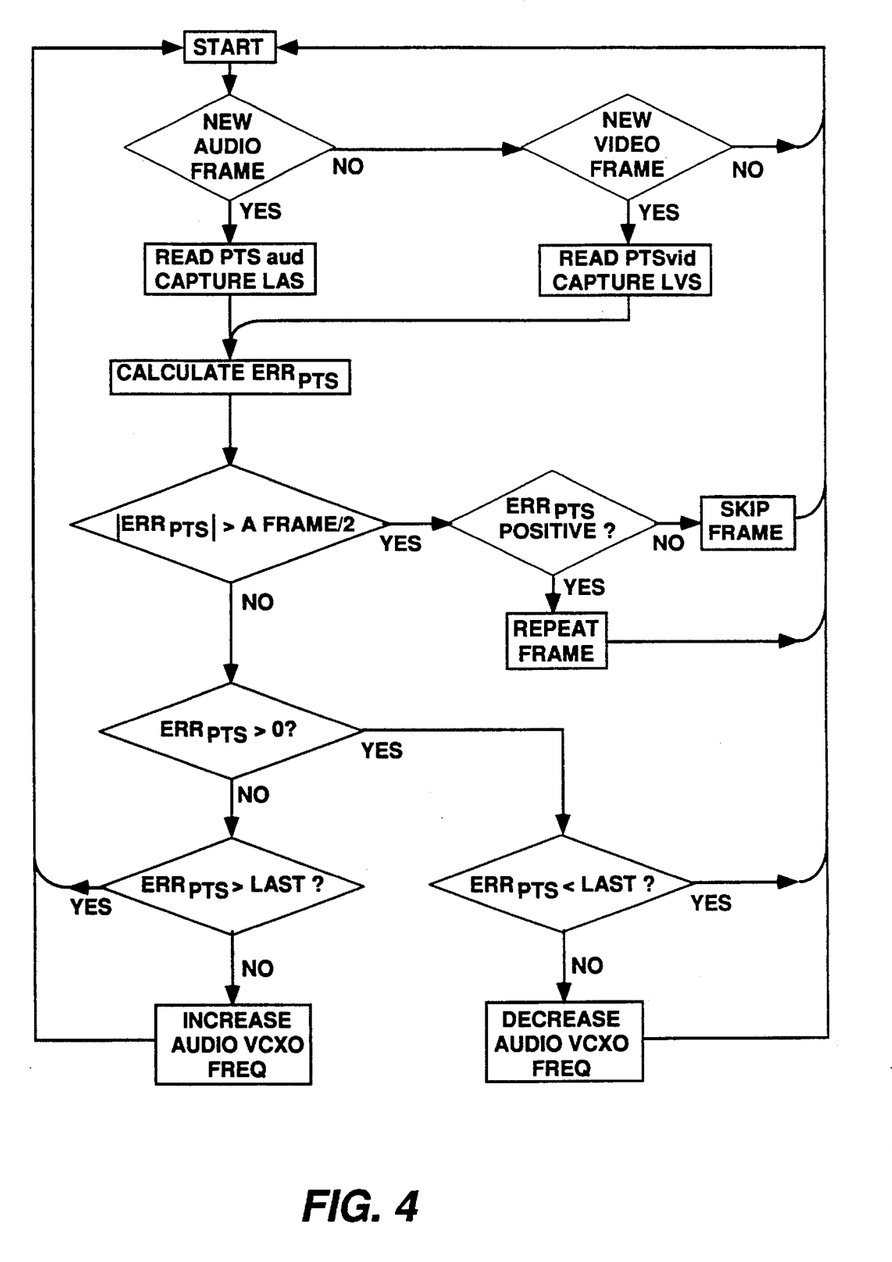
FIG. 4 is a flow chart of the operation of the FIG. 2 apparatus.

The processing algorithm is detailed in the flow chart of FIG. 4. After initialization 400 of the system, which is designated START, the system monitors 401 the audio decompressor for the occurrence of a $PTS_{aud}$ and if a $PTS_{aud}$ is detected it is read 403 and a local clock reference LAS is captured and stored. If a $PTS_{aud}$ has not occurred, the system monitors the video compressor for a $PTS_{vid}$ 402. If a $PTS_{vid}$ has occurred, the $PTS_{vid}$ is read and a local clock reference LVS is captured and stored. When both a $PTS_{aud}$ and a $PTS_{vid}$ have been read the $ERR_{PTS}$ is calculated 405 according to the equation;

$$ERR_{PTS} = \Delta_{V-PTS} - \Delta_{A-PTS}.$$

The magnitude of the error signal is examined 406 to determine if it is greater than one half an audio frame interval. If it is greater than one half an audio frame interval, the error signal is checked for polarity 407. If the polarity is positive, the current audio frame is repeated 409. If it is negative the current audio frame is skipped 408. After skipping or repeating a frame the system iterates back to the start position to wait for the next occurrence of PTS' s.

At step 406, if the magnitude of the error signal is less than one half an audio frame interval, the error is examined to determine if it is greater than zero 410. If the error is greater than zero, the error is checked 412 to determine if it is less than the previous error signal. If it is less than the previous error signal, this is an indication that the system is converging toward synchronization, and the synchronization control parameters are not changed. The system returns to the start position to wait for the next PTS's. Conversely, if the error has increased over the previous error signal, the audio system processing clock is adjusted to lessen its frequency 414.

At step 410, if the error is less than zero (negative), it is checked 411 to determine whether it is greater than the previous error signal. If it is greater than the previous error signal, this is also an indication that the system is converging toward synchronization, and the synchronization control parameters are not changed. Alternatively if the current error signal is less than the previous error signal the system is moving further out of synchronization and the audio processing clock frequency is increased 413. After processing steps 412 and 413 the system returns to wait for the next occurrence of PTS's. It will be noted in this example, that the system performs only coarse adjustments via skipping or repeating audio frames until the A/V synchronization error is reduced to less than one half an audio frame interval.

In an alternative embodiment, the filtered error signal is compared against a predetermined threshold related to the size of respective audio frames. If the error signal is less than the threshold, indicative that the audio-video timing error is less than an audio frame, the error signal is coupled to the audio time base circuit 215, wherein it is utilized to adjust the frequency of the audio signal processing (decompression) clock. Alternatively, if the error signal is greater than the threshold, the error signal may be divided by the audio frame interval to determine the number of audio frames that the audio and video signal are misaligned. The integer portion of the quotient is applied to the audio decompressor to condition the audio decompressor to skip or repeat that number of audio frames. The polarity of the error signal will determine whether audio frames should be skipped or repeated. Nominally the compressed data is arranged in a buffer memory prior to being decoded, hence skipping or repeating audio frames is a simple matter of controllably enabling the memory read/write commands.

The fractional portion of the quotient is coupled to the audio time base circuit 215, where it is utilized to adjust the audio processing clock to fine tune the A/V synchronization.

The rate of production of audio PTS's is proportional to the processing speed of the audio decompressor. The processing speed of the audio decompressor is directly proportional to the frequency of the clock signal used to operate the audio decompressor. If the clock frequency of the audio decompressor is independent of the clock used to operate the video decompressor, and is finely adjustable, then the relative rate of occurrence of the audio and video PTS's can be adjusted and the A/V finely synchronized.

Decompressed audio signal is coupled to a digital-to-analog converter (DAC) 227. Analog output signal from the DAC 227 is coupled to further analog processing circuitry (not shown) via a resistor 228. The conduction path of a muting transistor 229 is coupled between the resistor 228 and ground potential. The control electrode of the transistor is coupled to an output connection of a threshold detector 225. A positive control voltage of greater than one $V_{be}$ will condition the transistor 229 to clamp the audio output signal from DAC 227 to ground potential, thereby muting the audio signal.

Typically a compressed audio signal will include a plurality of components such as a left signal, a right signal, etc. FIG. 2 shows only one audio output for simplicity, however each audio channel will include a muting-circuit controlled by a common muting control signal.

Muting the audio signal may be performed for various reasons, not the least of which is loss of lip-sync. The current apparatus is unique in that it mutes audio based on lip-sync error.

A human viewer can notice lip-sync errors of −20 ms or +40 ms. In the illustrated exemplary system, audio is muted if the lip-sync error exceeds approximately 13 ms. The 13 ms threshold was chosen to be less than 20 ms but greater than one-half an MPEG1, layer II audio frame (which is 24 ms). The threshold was selected to be slightly greater than one half the audio frame because with A/V synchronizing frame skips and repeats, an initial synchronizing state at a half frame (12 ms) is possible, and a threshold of approximately 12 ms or less could result in synchronized, but muted audio. In addition, a threshold equivalent to one half frame produces intermittent muting due to minor fluctuation in calculated lip-sync errors due to clock and PTS strobe sampling uncertainties.

The muting control signal is generated by the threshold detector 225, which monitors the A/V synchronization error signal available from the subtracter 219. When the error signal exceeds a value corresponding to 13 ms, a muting control value is generated. To preclude noise or other impulsive conditions from causing generation of false muting signals, the error signals from the subtracter 219 may be low pass filtered before application to the threshold detector 225.

Dashed arrows emanating from the detector 225 and terminating on the DAC 227 and the audio decompressor 212 indicate alternative muting possibilities. For example, the muting control signal may be designed for disabling the output of the DAC 227 or the output of the decompressor 212. In either instance the disabling function should be arranged to condition the respective processing element to output a signal amplitude value midway between the output signal dynamic range. The FIG. 2 arrangement also indicates that video muting (or blanking) may be implemented via control of the video DAC 224.

Figure 5:
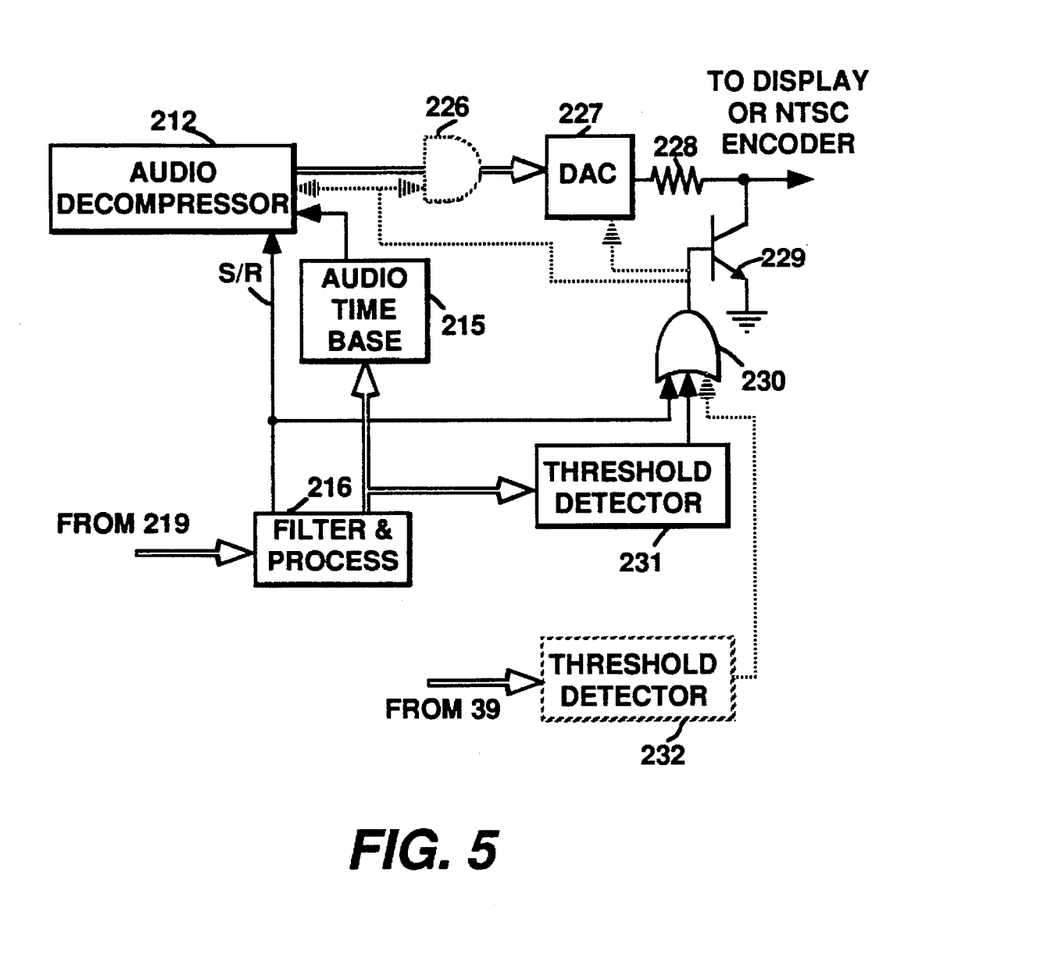
FIGS. 5 is a block diagram of alternative muting circuitry which may be implemented in the FIG. 2 apparatus.

FIG. 5 illustrates an alternative muting arrangement. In this embodiment the skip/repeat (S/R) signal generated by the filter 216 is used as the primary muting control. This signal is coupled to the muting circuitry via an OR gate 230. If in a particular system the fine control used to adjust the audio time base spans a range encompassing at least one half an audio frame, a threshold detector, 231, may be included to monitor the audio time base fine control signal and generate a secondary muting control signal. This secondary control signal is also coupled to the muting circuitry via the OR gate 230.

The apparatus of FIG. 5 illustrates a further possible muting circuit, consisting of an AND gate, 226, to selectively couple the decompressed audio signal from the decompressor 212 to the DAC 227. Nominally audio signals are bipolar (AC) and swing about zero value. The AND gate when in the decoupled state, desirably outputs zero value which is the middle of the signal dynamic range.

Currently, compressed A/V direct broadcast satellite systems are evolving in which a plurality of packeted programs are time division multiplexed and conveyed via a single transponder. A particular program may include only an audio signal, obviating lip-sync problems. However, undesirable audio may be reproduced if the system clock has not synchronized. Therefore, a further threshold detector, 232, may be included to monitor the error signal generated by the clock controller 39 shown in FIG. 3. The threshold detector, 232, generates a muting control signal when the error signal produced by the controller represents a frequency deviation from the locked condition by, for example, 0.2. This muting control signal is coupled to the OR gate 230 to effect audio muting until the system clock is substantially synchronized with the corresponding encoding system clock. Similarly, detection apparatus may be coupled to measure the frequency deviation of the audio time base 215 for generating a further muting signal which may be ORed in the gate 230.

What is claimed is:

1. In a receiver for processing compressed audio/video signal, apparatus comprising:

a detector for providing said compressed audio/video signal;

an audio decompressor, responsive to said compressed audio/video signal, for providing decompressed audio signal;

a video decompressor, responsive to said compressed audio/video signal, for providing decompressed video signal;

detection means for generating an error signal which is a measure of non-synchronization between associated decompressed audio and decompressed video signals; and muting means for muting said decompressed audio signal when said error signal exceeds a predetermined threshold.

2. The apparatus set forth in claim 1 wherein said muting means comprises:

a threshold detector, responsive to said error signal, for generating a control signal having first and second states when said error signal is greater and lesser than said predetermined threshold respectively; and signal clamping means, responsive to said control signal, for passing said decompressed audio signal when said control signal exhibits said second state and providing a substitute value for said decompressed audio signal when said control signal exhibits said first state.

3. The apparatus set forth in claim 2 wherein said clamping means comprises a digital to analog converter coupled to receive said decompressed audio signal and responsive to said control signal for converting or not converting said decompressed audio signal.

4. The apparatus set forth in claim 2 wherein said clamping means comprises an AND gate coupled to receive said decompressed audio signal and having an enable input coupled to said threshold detector.

5. In a receiver for processing compressed audio/video signal, apparatus comprising:

a detector for providing said compressed audio/video signal;

an audio decompressor, responsive to said compressed audio/video signal, for providing decompressed audio signal;

a video decompressor, responsive to said compressed audio/video signal, for providing decompressed video signal;

a first detector, for generating a first control signal having first and second states when said decompressed audio and decompressed video signals are relatively non synchronized and synchronized respectively;

synchronization circuitry, responsive to said compressed audio/video signal, for generating a system clock signal having a predetermined relation to an encoder system clock signal used in generation of said compressed audio/video signal, and including a second detector for providing an error signal which is a measure of non-synchronization of said system clock signal;

a threshold detector, responsive to said error signal, for generating a second control signal having said first and second states when said error signal is greater and lesser than a predetermined threshold respectively; and muting circuitry coupled to mute said decompressed audio signal when either of said first and second control signals exhibit said first state.

6. The apparatus set forth in claim 1 wherein said detection means for generating an error signal, is a lip-sync detector.

7. In a receiver for processing compressed audio/video signal, wherein audio and video components of said compressed audio/video signal include respective time stamps $PTS_{aud}$ and $PTS_{vid}$ determined at predetermined times and related to an encoder system clock, apparatus comprising:

a detector for providing said compressed audio/video signal;

an audio decompressor, responsive to said compressed audio/video signal, for providing decompressed audio signal and associated time stamps $PTS_{aud}$;

a video decompressor, responsive to said compressed audio/video signal, for providing decompressed video signal and associated time stamps $PTS_{vid}$;

a source of a local clock signal;

means for determining, in cycles of said local clock signal, the time T between occurrences of corresponding time stamps $PTS_{aud}$ and $PTS_{vid}$;

means for calculating the difference between values of corresponding time stamps $PTS_{aud}$ and $PTS_{vid}$ and comparing such difference with said time T to generate an A/V synchronization control signal;

a threshold detector for generating an error signal when said A/V synchronization control signal exceeds a predetermined value; and muting circuitry responsive to said error signal, to mute said decompressed audio signal.

8. The apparatus set forth in claim 7 wherein said audio decompression apparatus decompresses audio signal in predetermined intervals, and said apparatus further includes:

means responsive to said A/V synchronization control signal for synchronizing decompressed audio and video signals, and including apparatus for generating a further control signal to condition said audio decompressor to skip or repeat predetermined intervals of said audio signals; and circuitry for ORing said further control signal with said error signal to generate a composite error signal for controlling said muting circuitry.

9. The apparatus set forth in claim 7 further including:

synchronization circuitry, responsive to said compressed audio/video signal, for synchronizing said local clock signal to an encoder system clock signal used in generation of said compressed audio/video signal, and including a further detector for providing a further control signal which is a measure of non-synchronization of said system clock signal;

a further threshold detector, responsive to said further control signal, for generating a further error signal when said further control signal is greater than a predetermined threshold; and said muting circuitry is responsive to said error signal and said further error signal, to mute said decompressed audio signal when either said control signal exceeds said predetermined value or said further control signal is greater than said predetermined threshold.

10. In a receiver for processing compressed audio/video signal, wherein audio and video components of said compressed audio/video signal include respective time stamps $PTS_{aud}$ and $PTS_{vid}$ determined at predetermined times and related to an encoder system clock, apparatus comprising:

a detector for providing said compressed audio/video signal;

an audio decompressor, responsive to said compressed audio/video signal, for providing decompressed audio signal and associated time stamps $PTS_{aud}$;

a video decompressor, responsive to said compressed audio/video signal, for providing decompressed video signal and associated time stamps $PTS_{vid}$;

detection means for generating an error signal which is a function of the difference between the values of said time stamps $PTS_{aud}$ and $PTS_{vid}$ for associated decompressed audio and video; and a muting circuit, responsive to said error signal, to mute said decompressed audio signal when said difference exceeds a predetermined threshold.

* * * * *